United States Patent
Renshaw

(10) Patent No.: US 6,926,261 B1
(45) Date of Patent: Aug. 9, 2005

(54) TRAILER TONGUE JACK

(75) Inventor: Ronald H. Renshaw, Longview, WA (US)

(73) Assignee: Kaper II, Inc., Kelso, WA (US)

( * ) Notice: Subject to any disclaimer, the term of this patent is extended or adjusted under 35 U.S.C. 154(b) by 0 days.

(21) Appl. No.: 10/898,507

(22) Filed: Jul. 26, 2004

(51) Int. Cl.$^7$ ................................................ B60S 9/02
(52) U.S. Cl. .................... 254/420; 254/419; 254/425
(58) Field of Search ............................... 254/419–425, 254/89 H, 93 R, 100

(56) References Cited

U.S. PATENT DOCUMENTS

| | | | |
|---|---|---|---|
| 2,159,395 A | 5/1939 | Mersereau | |
| 2,638,315 A | 5/1953 | Wagner | |
| 3,288,435 A | 11/1966 | Starkey | |
| 3,314,692 A | 4/1967 | Karns | |
| 3,345,037 A | 10/1967 | Sweetland, Jr. | |
| 3,351,321 A | 11/1967 | Grams et al. | |
| 3,764,109 A | 10/1973 | Hollis, Jr. ............... | 254/86 R |
| 3,783,960 A * | 1/1974 | Feliz ....................... | 180/14.2 |
| 5,125,290 A * | 6/1992 | Cotter .................. | 74/665 GA |
| 5,421,555 A | 6/1995 | Sims ....................... | 254/420 |
| 5,435,523 A | 7/1995 | Hying et al. .............. | 254/420 |
| 5,462,269 A | 10/1995 | Schroeder et al. ........ | 273/15 R |
| 5,560,655 A * | 10/1996 | Cameron .................. | 285/39 |
| 6,267,357 B1 * | 7/2001 | Ebey et al. ............... | 254/419 |
| 6,485,002 B1 | 11/2002 | Goss ....................... | 254/420 |

* cited by examiner

Primary Examiner—Lee D. Wilson
(74) Attorney, Agent, or Firm—Kenneth L. Green; Edgar W. Averill, Jr.

(57) ABSTRACT

A trailer tongue jack includes a grease (or zerk) fitting for providing grease to internal parts The jack includes an outer tube and an inner telescoping tube. A threaded insert (or nut) is fixedly attached inside an upper end of the inner telescoping tube. A screw shaft threadedly cooperates with the insert to extend or retract the inner telescoping tube from a lower end of the outer tube. A crank is provided to turn the screw shaft either directly or through gears, and a thrust bearing carries a vertical load between the screw shaft and the outer tube. The grease fitting allows the internal parts, and the thrust bearing in particular, to be easily lubricated.

17 Claims, 6 Drawing Sheets

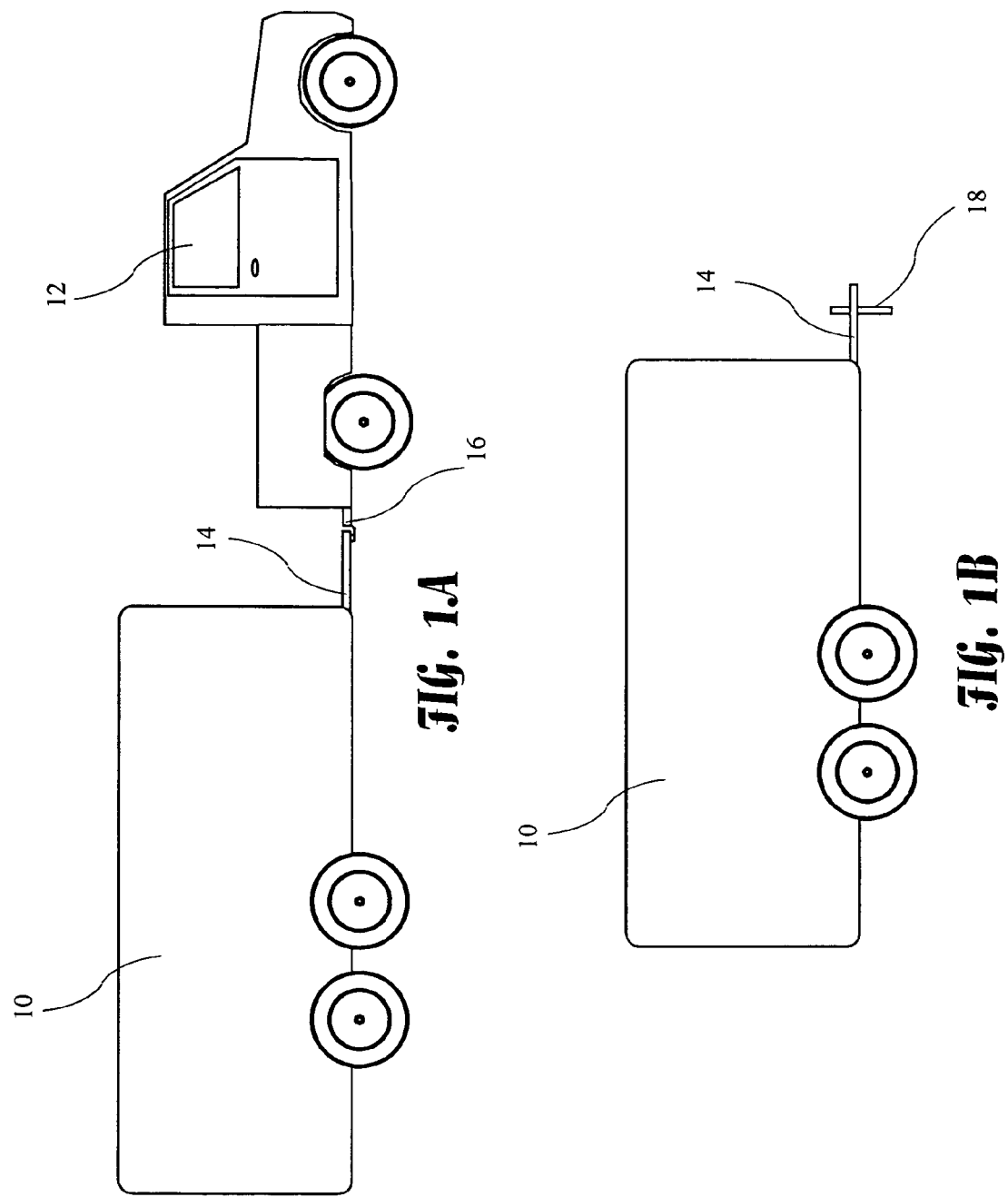

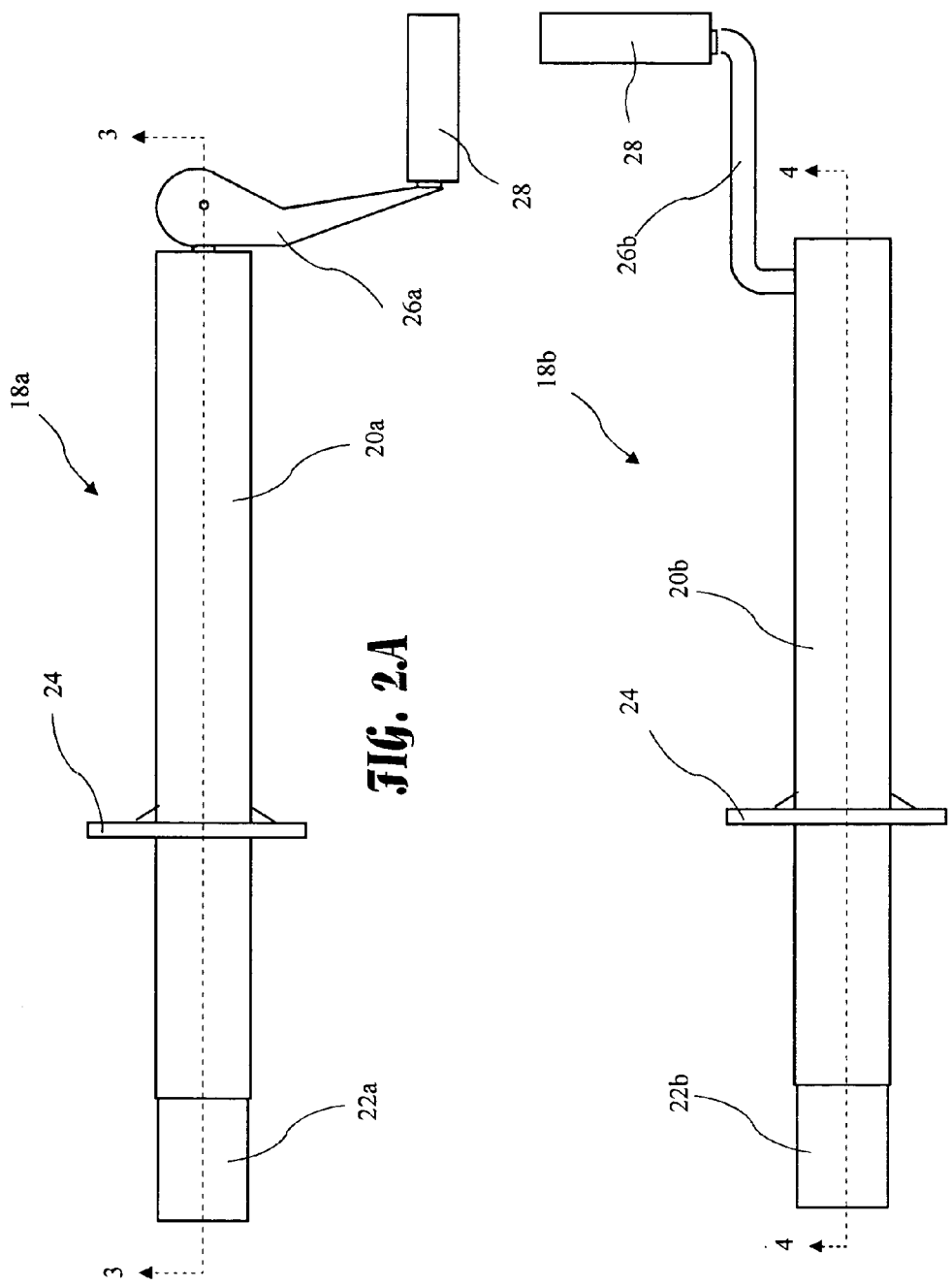

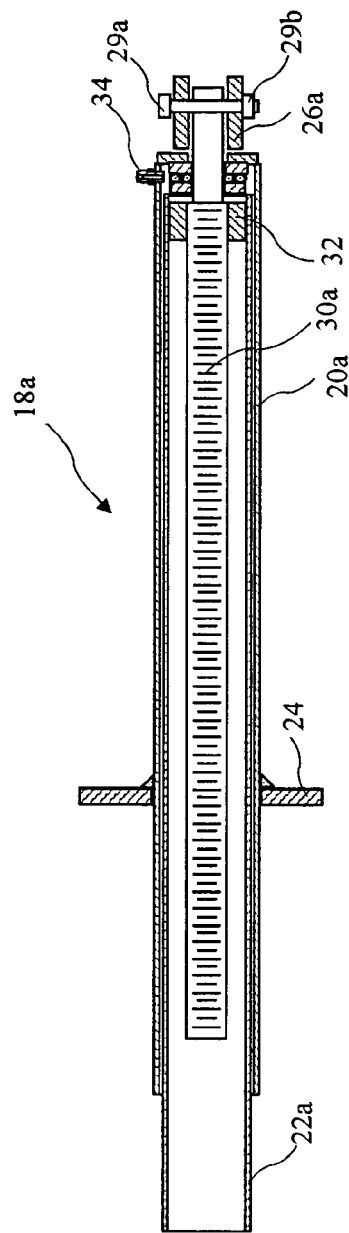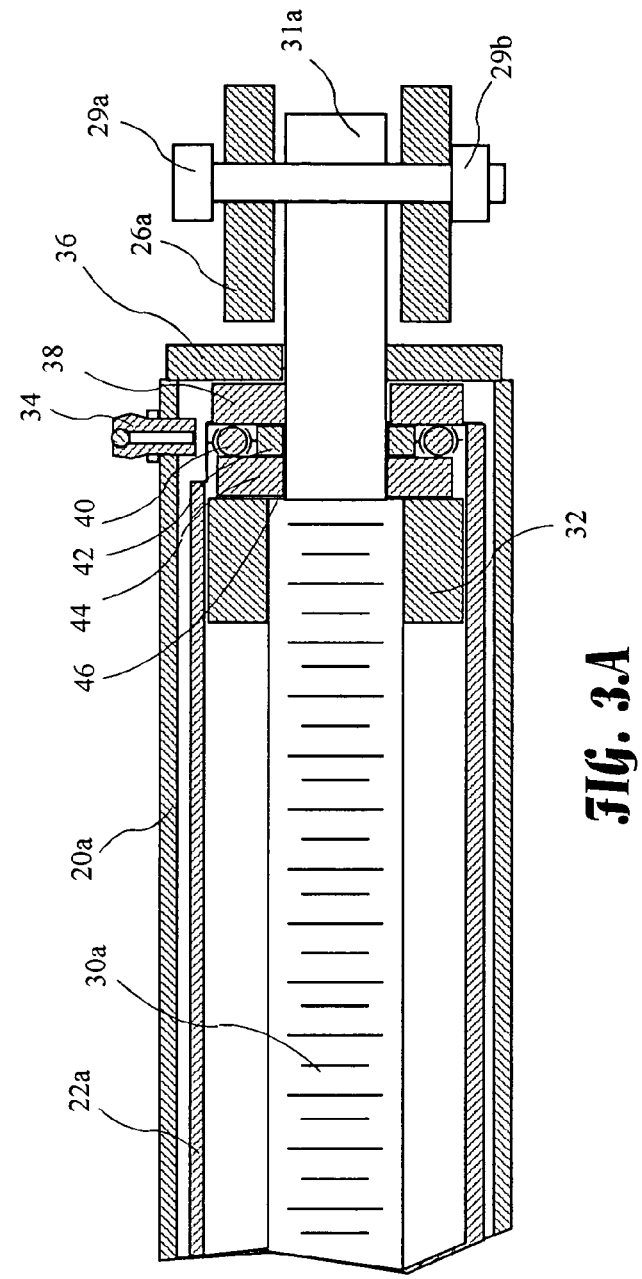

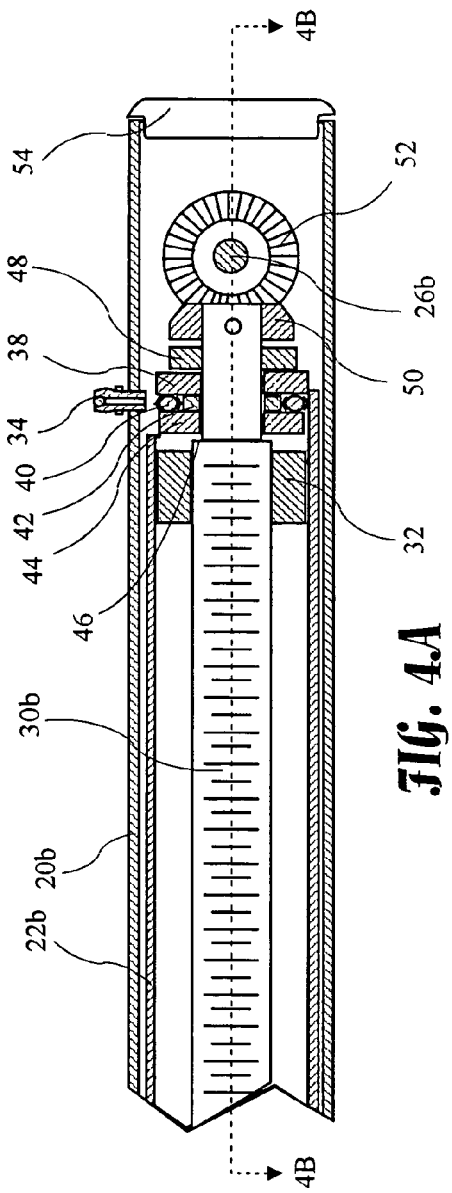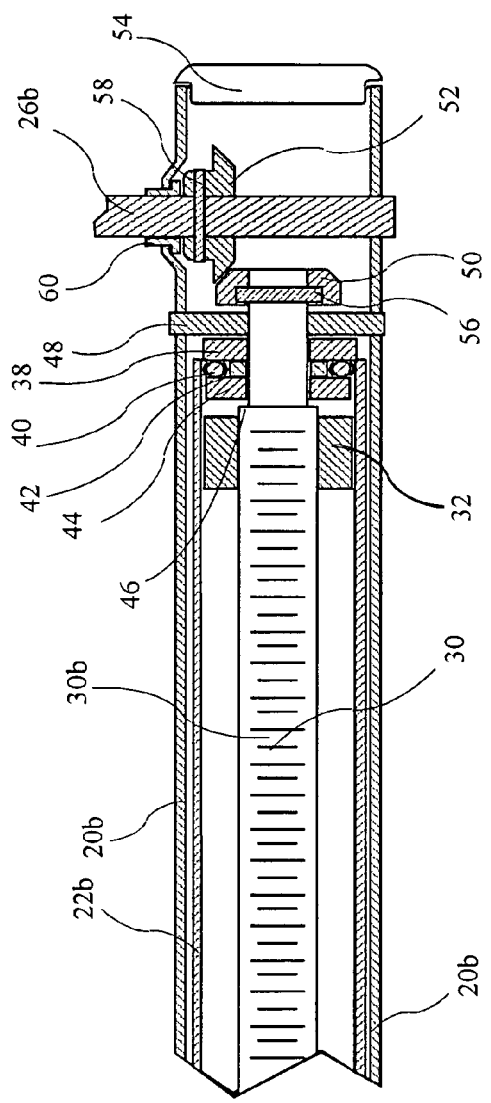
FIG. 4A
FIG. 4B

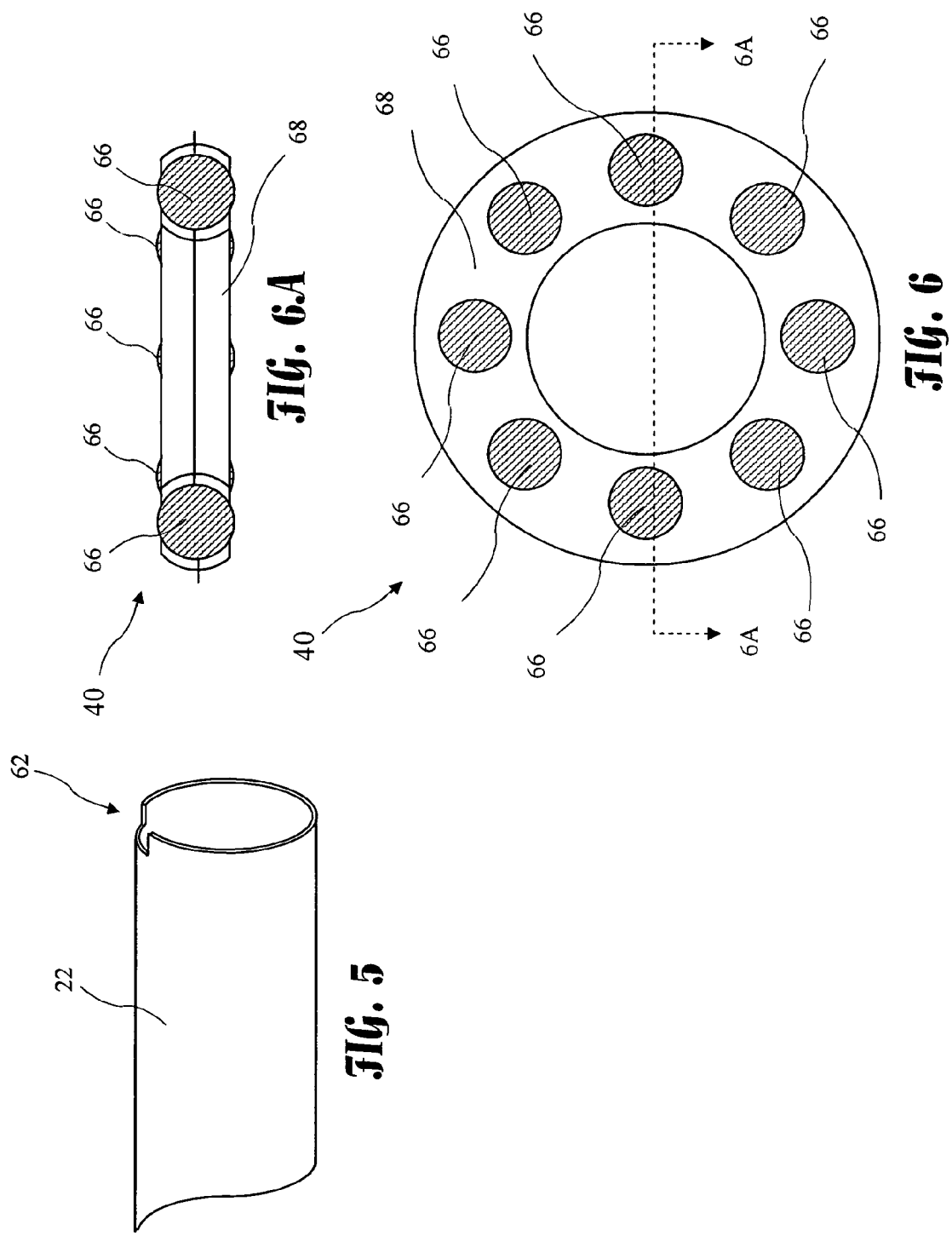

TRAILER TONGUE JACK

BACKGROUND OF THE INVENTION

The present invention relates to accessories for trailers and in particular to an improved tongue jack.

When a trailer is parked and detached from a tow vehicle, a support is required for the trailer tongue. Although other objects might be used, generally a special purpose jack (called a trailer jack or tongue jack) attached to the tongue is used. Trailer jacks generally are mounted vertically, or are pivotable to a vertical position, and have a telescoping portion and a crank for upwardly and downwardly moving the telescoping portion. Such jack provides static support, leveling, and facilitates detaching the tongue from the trailer hitch on the tow vehicle by allowing the tongue to the raised relative to the hitch and thereby disengaging from the hitch. Large trailers generally have significant tongue weight for safety and control. The tongue jack much be able to support the tongue weight, and allow operation without undue effort.

Devices for supporting trailer tongues are well known. U.S. Pat. No. 2,159,395 for "Trailer Control," describes a pivotable wheel assembly which may be cranked to a down position whereby the trailer tongue is supported. U.S. Pat. No. 2,638,315 for "Trailer Attached Jack," describes a simple telescoping jack for supporting a trailer tongue. U.S. Pat. No. 2,638,315 for "Trailer Attached Jack," describes a telescoping tongue jack similar to modern jacks. The jack of the '315 patent includes a crank for turning a screw shaft, which screw shaft is held in place by a thrust bearing, and cooperates with a nut attached to an inner telescoping tube to extend or retract the inner tube.

U.S. Pat. No. 3,314,693 for "Retractable Trailer Tongue Jack," describes a jack having a screw shaft with a ring gear. A crank turns a pinion gear engaging the ring gear to turn the screw shaft, thereby extending or retracting an inner tube. U.S. Pat. No. 5,435,523 for "Trailer Tongue Jack," describes a tongue jack with a pair of cooperating beveled gears coupling a crank to a screw shaft.

When known tongue jacks are used with heavy trailers having substantial tongue weight, the thrust bearings require lubrication to reduce wear and provide easy use. Commonly, such lubrication is provided by opening the trailer jack assembly and applying grease to internal parts. Unfortunately, such opening and applying may be a messy operation, and the grease frequently escapes the jack assembly, resulting in the grease on hands and clothing.

BRIEF SUMMARY OF THE INVENTION

The present invention addresses the above and other needs by providing a trailer tongue jack which includes a grease (or zerk) fitting for providing grease to internal parts The jack includes an outer tube and an inner telescoping tube. A threaded insert (or nut) is fixedly attached inside an upper end of the inner telescoping tube. A screw shaft threadedly cooperates with the insert to extend or retract the inner telescoping tube from a lower end of the outer tube. A crank is provided to turn the screw shaft either directly or through gears, and a thrust bearing carries a vertical load between the screw shaft and the outer tube. The grease fitting allows the internal parts, and the thrust bearing in particular, to be easily lubricated.

In accordance with one aspect of the invention, there is provided a trailer jack comprising an outer tube having a first top end, and a first bottom end, an inner tube having a second top end, a second bottom end, and being slidable inside the outer tube. A threaded insert is fixedly attached to the inner tube proximal to the second top end of the inner tube. A rotatable screw shaft is translationally fixed relative to the outer tube and is threadedly coupled to the insert. Turning the screw shaft a first direction extends the inner tube from the first bottom end of the outer tube, and turning the screw a second direction retracts the inner tube into the first bottom end of the outer tube. A thrust bearing is adapted to carry a vertical load between the screw shaft and the outer tube, and a grease fitting attached to the top end of the outer tube and adapted to provide grease to the thrust bearing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a trailer connected to a tow vehicle.

FIG. 1B depicts the trailer detached from the tow vehicle with a trailer jack supporting a tongue of the trailer.

FIG. 2A shown a first trailer jack with a first crank attached to a top end of the jack.

FIG. 2B shows a second trailer jack with a second crank attached to a side of the jack.

FIG. 3 is a cross-sectional view of the first trailer jack taken along line 3—3 of FIG. 2A.

FIG. 3A is a detailed view of a top portion of the first trailer jack taken along line 3—3 of FIG. 2A.

FIG. 4A is a detailed view of a top portion of the second trailer jack taken along line 4—4 of FIG. 2B.

FIG. 4B is a detailed view of the top portion of the second trailer jack rotated 90 degrees, taken along line 4—4 of FIG. 2B.

FIG. 5 is a detailed view of a notch in a top end of the inner tube.

FIG. 6 is a thrust bearing comprising ball bearings held in a bearing race.

FIG. 6A is a cross-sectional view of the thrust bearing taken along line 6A—6A of FIG. 6.

Corresponding reference characters indicate corresponding components throughout the several views of the drawings.

DETAILED DESCRIPTION OF THE INVENTION

Figure 3B:
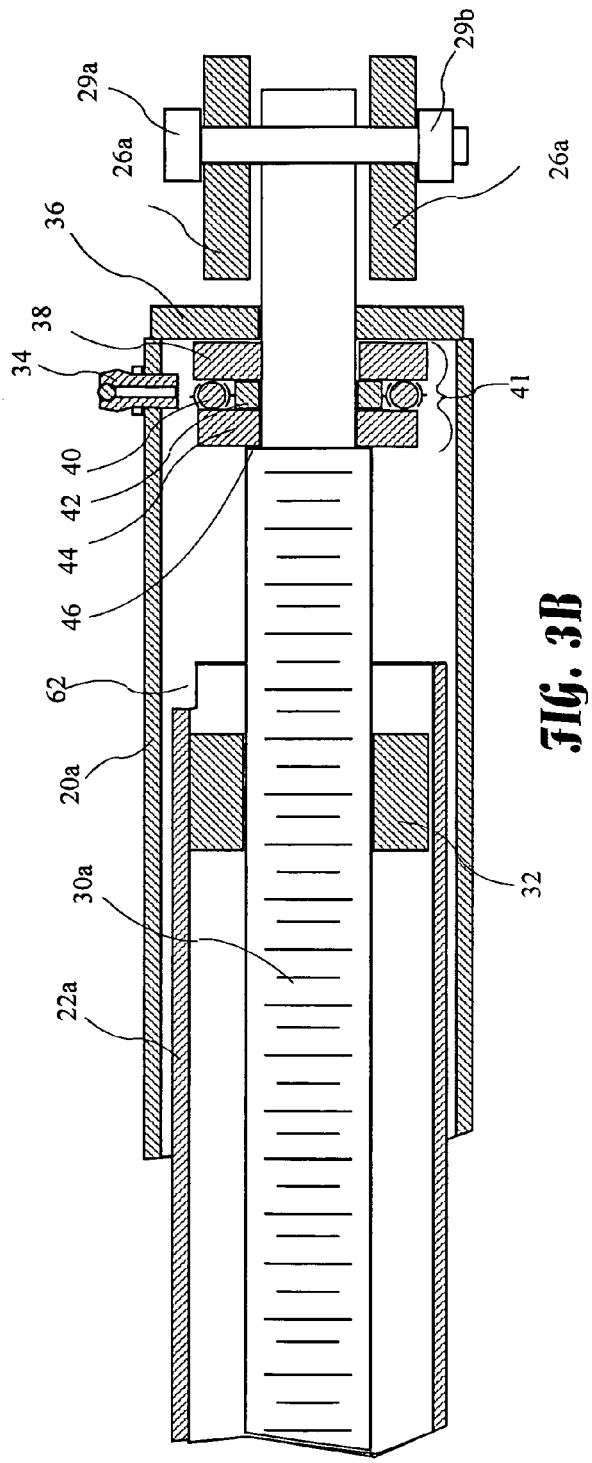
FIG. 3B is a second detailed view of a top portion of the first trailer jack taken along line 3—3 of FIG. 2A with an inner tube partially extended.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A trailer 10 connected to a tow vehicle 12 is shown in FIG. 1A. The trailer 10 includes a trailer tongue 14 which is connected to a trailer hitch 16 of the tow vehicle 12. The tongue 14 and hitch 16 combine to provide a connection for pulling the trailer 10, and vertical support for the tongue 14. The total weight transferred from the tongue 14 to the hitch 16 is called "tongue weight", and heavy trailers often have significant tongue weight. The trailer 10 is shown detached from the tow vehicle 14 in FIG. 1B. A trailer jack 18 is used to support the tongue weight.

A first trailer jack 18a with a first crank 26a attached to a top end of the jack 18a is shown in FIG. 2A. The jack 18a includes a first outer tube 20a, a first inner tube 22a, and a first crank 26a. The outer tube 20a includes a flange 24 for mounting the jack 18a to the tongue 14, and the crank 26a includes a handle 28. A second trailer jack 18b with a second crank 26b attached to a side of the jack 18b near the top of the outer tube 20b is shown in FIG. 2B.

A cross-sectional view of the first trailer jack 18a taken along line 3—3 of FIG. 2A is shown in FIG. 3. A threaded insert (or nut) 32 is fixedly attached to the inner tube 22a proximal to the top end of the inner tube 22a. A first screw shaft 30a is translationally fixed relative to the outer tube and threadedly coupled to the threaded insert 32, wherein turning the screw shaft 30a a first direction extends the inner tube 22a from the bottom end of the outer tube 20a, and turning the screw a second direction retracts the inner tube 22a into the bottom end of the outer tube 20a. A lubrication fitting 34 is shown attached to the top end of the outer tube 20a and adapted to provide lubrication to a jack interior portion defined by the interiors of the outer tube 20a and the inner tube 22a. The lubrication fitting 34 is preferably a grease (or zerk) fitting, and a preferred lubricant is grease.

A detailed view of a top portion of the first trailer jack 18a taken along line 3—3 of FIG. 2A is shown in FIG. 3A. The first crank 26a is attached to a first shaft top 31a by a crank bolt 29a and crank nut 29b. When the crank 26a is turned to extend the inner tube 22a, an upward vertical force (to the right in the figures) results on the screw shaft 30a. An opposing force is required to retain the screw shaft 30a in the outer tube 20a. The opposing force is provided by a thrust bearing assembly 41 (see FIG. 3B) sandwiched between a shaft shoulder 46 and a retainer (e.g., tube cap 36) attached to the outer tube 20a. The thrust bearing assembly 41 comprises a lower thrust washer 44, a thrust bearing 40, a bearing spacer 42, and a upper thrust washer 38. The upper tube cap 36 acts as a retainer for the first jack 18a. The lubrication fitting 34 is positioned to provide lubricant to the thrust bearing 40. The thrust bearing 40 is preferably a ball bearing (see FIGS. 6, 6A).

The jack 18a with the internal tube 22a extended from a bottom end of the outer tube 20a is shown in FIG. 3B. The screw shaft 30a is turned to thus extend the inner tube 22a from the outer tube 20a, and the screw shaft 30a is held in place by the cooperation of the shaft shoulder 46 with the thrust bearing assembly 41. A notch 62 in the top end of the inner tube 22a is aligned with the lubrication fitting 34 and allows lubricant to reach the thrust bearing assembly 41 when the inner tube 22a is in the full upward position (see FIG. 3A).

Figure 4:
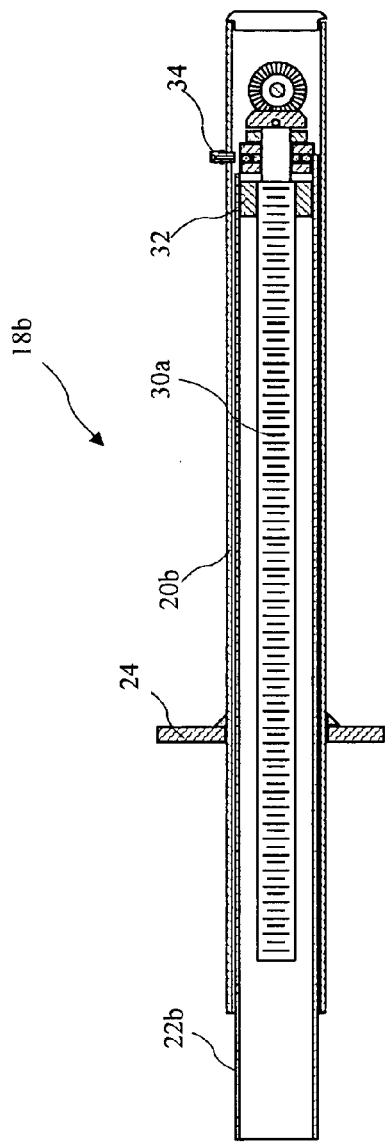
FIG. 4 is a cross-sectional view of the second trailer jack taken along line 4—4 of FIG. 2B.

A cross-sectional view of the second trailer jack 18b taken along line 4—4 of FIG. 2B is shown in FIG. 4. The jack 18 be includes gears 50, 52 for operationally connecting the second crank 26b to the second screw shaft 30b.

A detailed view of a top portion of the second trailer jack 18b taken along line 4—4 of FIG. 2B is shown in FIG. 4A. The thrust bearing assembly 41 is sandwiched between the shoulder 46 and a retainer comprising a retainer plate 48. Gears comprise a driven bevel gear 50 and a drive bevel gear 52. While beveled gears 50, 52 are preferred, other operational connections, for example a ring gear and a pinion gear, or a ring gear and screw, may be used. A cap 54 covers the top end of the outer tube 22b.

A second detailed view of the top portion of the second trailer jack rotated 90 degrees, taken along line 4—4 of FIG. 2B, is shown in FIG. 4B. The retainer plate 48 extends through the outer tube 20b to fix the position of the retainer plate 48. The gear 50 is fixed to the screw shaft 30b by a first pin 56, and the gear 52 is fixed to the crank 26b by a second pin 58. A gear plate 60 resides in the crank 26b to provide backing for the gear 52, thereby holding the gear 52 against the gear 50. The lubrication fitting 34 may be further adapted to provide lubrication to the gears 50, 52, and to the gear plate 60, thereby extending the life of the gears 50, 52 and gear plate 60, and reducing the effort required to extend the inner tube 22b from the outer tube 20b.

A detailed view of the notch 62 in a top end of the inner tubes 22a, 22b is shown in FIG. 5, which notch 62 is aligned with the lubrication fitting 34 (see FIG. 3A), thereby providing access of lubricant to the thrust bearing assembly 41 (see FIG. 3B). A preferred thrust bearing 40 is shown in FIG. 6, and a cross-sectional view of the thrust bearing 40 taken along line 6A—6A of FIG. 6 is shown in FIG. 6A. The thrust bearing 40 comprises ball bearings 66 held by a bearing race 68. The race 68 preferably has an outside diameter of approximately 34.75 millimeters, and an inside diameter of approximately 20.3 millimeters. The ball bearings 66 preferably comprise thirteen ball bearings of approximately 5.55 millimeter diameter.

While the invention herein disclosed has been described by means of specific embodiments and applications thereof, numerous modifications and variations could be made thereto by those skilled in the art without departing from the scope of the invention set forth in the claims.

I claim:

1. A linear jack comprising:
   an outer tube having a first interior, a first top end, and a first bottom end;
   an inner tube having a second interior, a second top end, a second bottom end, and being slidable inside the outer tube;
   a threaded insert fixedly attached to the inner tube proximal to the second top end of the inner tube;
   a rotatable screw shaft translationally fixed relative to the outer tube and threadedly coupled to the insert, wherein turning the screw shaft a first direction extends the inner tube from the first bottom end of the outer tube, and turning the screw a second direction retracts the inner tube into the first bottom end of the outer tube;
   a jack interior defined by the combination of the first interior of the outer tube and the second interior of the inner tube; and
   a lubrication fitting in fluid communication with the jack interior wherein the second top end of the inner tube includes a notch aligned with the lubrication fitting, wherein lubrication may pass into the jack interior through the notch and the second top end of the inner tube may extend upwardly past the lubrication fitting.

2. The linear jack of claim 1, wherein the lubrication fitting is proximal to the first top end of the outer tube.

3. The linear jack of claim 2, wherein the lubrication fitting is attached to the outer tube.

4. The linear jack of claim 3, wherein the second top end of the inner tube include a notch aligned with the lubrication fitting, wherein lubrication may pass into the jack interior through the notch.

5. The linear jack of claim 1, wherein the lubrication fitting is a grease fitting.

6. The linear jack of claim 1, wherein the lubrication fitting is a zerk fitting.

7. The linear jack of claim 1, further including a thrust bearing adapted to carry a vertical load between the screw shaft and the outer tube, and wherein the lubrication fitting is adapted to provide lubrication to the thrust bearing.

8. The linear jack of claim 7, wherein screw shaft includes a shaft shoulder at a shaft upper portion, and wherein the thrust bearing is sandwiched between the shaft shoulder and a retainer attached to the outer tube.

9. The linear jack of claim 7, wherein the thrust bearing comprises a multiplicity of ball bearings and a bearing race, and wherein the lubrication fitting is adapted to provide lubrication to the multiplicity of ball bearings.

10. The linear jack of claim 1, further including a crank and a pair of gears for operationally connecting the crank to the screw shaft, and wherein lubrication fitting is adapted to provide lubrication to the gears.

11. A trailer jack comprising:
   an outer tube having a first top end, and a first bottom end;
   an inner tube having a second top end, a second bottom end, and being slidable inside the outer tube;
   a threaded insert fixedly attached to the inner tube proximal to the second top end of the inner tube;
   a rotatable screw shaft translationally fixed relative to the outer tube and threadedly coupled to the insert, wherein turning the screw shaft a first direction extends the inner tube from the first bottom end of the outer tube, and turning the screw a second direction retracts the inner tube into the first bottom end of the outer tube;
   a thrust bearing adapted to carry a vertical load between the screw shaft and the outer tube; and
   a grease fitting having a grease inlet and a grease outlet attached to the top end of the outer tube through an outer tube wall and positioned so that the grease outlet is directly aimed at the thrust bearing so that grease exiting the grease outlet contacts the thrust bearing to provide grease to the thrust bearing.

12. The linear jack of claim 11, wherein the second top end of the inner tube include a notch aligned with the grease fitting, wherein lubrication may pass into the jack interior through the notch.

13. The linear jack of claim 11, further including a crank and a pair of gears for operationally connecting the crank to the screw shaft, and wherein the grease fitting is adapted to provide lubrication to the gears.

14. The linear jack of claim 11, wherein the thrust bearing comprises a multiplicity of ball bearings and a bearing race, and wherein the lubrication fitting is adapted to provide lubrication to the multiplicity of ball bearings.

15. A telescoping jack comprising:
   an outer tube having a first top portion, and a first bottom portion;
   an inner tube having a second top portion, a second bottom portion, and being slidable inside the outer tube;
   a threaded insert fixedly attached to the inner tube proximal to the second top portion of the inner tube;
   a rotatable screw shaft translationally fixed relative to the outer tube and threadedly coupled to the insert, wherein turning the screw shaft a first direction extends the inner tube from the first bottom portion of the outer tube, and turning the screw a second direction retracts the inner tube into the first bottom portion of the outer tube;
   a thrust bearing adapted to carry a vertical load between the screw shaft and the outer tube; and
   a zerk fitting attached to the top portion of the outer tube and adapted to provide grease to the thrust bearing wherein the second top end of the inner tube includes a notch aligned with the zerk fitting, wherein lubrication may pass into the jack interior through the notch and the second top end of the inner tube may extend upwardly past the zerk fitting.

16. The linear jack of claim 15, wherein the thrust bearing comprises a multiplicity of ball bearings and a bearing race, and wherein the lubrication fitting is adapted to provide lubrication to the multiplicity of ball bearings.

17. The linear jack of claim 15, further including a crank and a pair of gears for operationally connecting the crank to the screw shaft, and wherein the grease fitting is adapted to provide lubrication to the gears.

* * * * *